(12) United States Patent
Brown et al.

(10) Patent No.: US 8,153,834 B2
(45) Date of Patent: *Apr. 10, 2012

(54) SURFACE MODIFIED INORGANIC PARTICLES

(75) Inventors: Gerald Oronde Brown, Wilmington, DE (US); Axel Hans-Joachim Herzog, West Chester, PA (US)

(73) Assignee: E.I. duPont de Nemours and Company, Wilmington, DE (US)

( * ) Notice: Subject to any disclaimer, the term of this patent is extended or adjusted under 35 U.S.C. 154(b) by 637 days.

This patent is subject to a terminal disclaimer.

(21) Appl. No.: 12/328,122

(22) Filed: Dec. 4, 2008

(65) Prior Publication Data

US 2009/0176097 A1    Jul. 9, 2009

Related U.S. Application Data

(60) Provisional application No. 61/005,667, filed on Dec. 5, 2007.

(51) Int. Cl.
C07F 7/04 (2006.01)
C07D 231/00 (2006.01)
(52) U.S. Cl. ........................... 556/413; 548/110
(58) Field of Classification Search .................. 556/413; 548/110
See application file for complete search history.

(56) References Cited

U.S. PATENT DOCUMENTS

| | | | |
|---|---|---|---|
| 4,171,282 A | 10/1979 | Mueller | |
| 5,084,653 A | 1/1992 | Nilssen | |
| 5,726,247 A | 3/1998 | Michalczyk et al. | |
| 6,767,587 B1 | 7/2004 | Brown | |
| 7,056,845 B2 | 6/2006 | Waeber et al. | |
| 2002/0150723 A1 | 10/2002 | Oles et al. | |
| 2002/0150724 A1 | 10/2002 | Nun et al. | |
| 2002/0150725 A1 | 10/2002 | Nun et al. | |
| 2003/0013795 A1 | 1/2003 | Nun et al. | |
| 2003/0147932 A1 | 8/2003 | Nun et al. | |
| 2003/0224174 A1 | 12/2003 | White et al. | |
| 2003/0229157 A1 | 12/2003 | Schneider et al. | |
| 2004/0154106 A1 | 8/2004 | Oles et al. | |
| 2005/0103457 A1 | 5/2005 | Nun et al. | |
| 2005/0112326 A1 | 5/2005 | Nun et al. | |
| 2005/0118433 A1 | 6/2005 | Oles et al. | |
| 2005/0167877 A1 | 8/2005 | Nun et al. | |
| 2005/0205830 A1 | 9/2005 | Oles et al. | |
| 2005/0253302 A1 | 11/2005 | Nun et al. | |
| 2005/0272334 A1 | 12/2005 | Wang et al. | |
| 2006/0049376 A1 | 3/2006 | Nun et al. | |
| 2006/0110537 A1 | 5/2006 | Huang et al. | |
| 2006/0128239 A1 | 6/2006 | Nun et al. | |
| 2006/0141223 A1 | 6/2006 | Oles et al. | |
| 2006/0147675 A1 | 7/2006 | Nun et al. | |
| 2006/0156475 A1 | 7/2006 | Oles et al. | |
| 2006/0172641 A1 | 8/2006 | Hennige et al. | |
| 2006/0222815 A1 | 10/2006 | Oles et al. | |
| 2007/0014970 A1 | 1/2007 | Nun et al. | |
| 2009/0143598 A1 | 6/2009 | Herzog | |

FOREIGN PATENT DOCUMENTS

| | | |
|---|---|---|
| CN | 1441147 A | 9/2003 |
| CN | 1454921 A | 11/2003 |
| CN | 1469021 A | 1/2004 |
| CN | 1539860 A | 10/2004 |
| CN | 1614128 A | 5/2005 |
| CN | 1614129 A | 5/2005 |
| CN | 1727566 A | 2/2006 |
| DE | 19938551 A1 | 2/2001 |
| DE | 10051182 A1 | 5/2002 |
| EP | 1340616 A2 | 9/2003 |
| EP | 1479738 A1 | 11/2004 |
| EP | 1559750 A2 | 8/2005 |
| JP | 1997309745 A | 12/1997 |
| JP | 200253805 | 2/2002 |
| KR | 1020050102470 | 10/2005 |
| WO | 9820081 A1 | 5/1998 |
| WO | 02064266 A2 | 8/2002 |
| WO | 2004104116 A1 | 12/2004 |
| WO | 2004106252 A1 | 12/2004 |
| WO | 2005021843 A1 | 3/2005 |
| WO | 2005068399 A1 | 7/2005 |
| WO | 2006007754 A1 | 1/2006 |
| WO | 2006015718 A1 | 2/2006 |
| WO | 2006032511 A1 | 3/2006 |
| WO | 2006037148 A1 | 4/2006 |

OTHER PUBLICATIONS

Haas et al. CAS: 131:338320, 1999.*
Morita et al. CAS: 140:295894, 2004.*
Yoshinaga et al. CAS: 125:116129, 1996.*
Gulrajani, Nano Finishes, Indian Journal of Fibre & Textile Research, 2006, 187-201, 31(1), National Institute of Science Communication and Information Resources, India.
Gulrajani, Nanotechnology: Nano Finishes, Asian Dyer, 2006, 63-75, 3(1), G.P.S. Kwatra, India.
Pilotek & Schmidt, Hydrophobic and Oleophobic Coatings, Sol-Gel Technologies for Glass Producers and Users, 2004, 179-186, Kluwer Academic Publishers, Norwell, Mass.
Thomann et al., PMMA Gradient Materials and in Situ Nanocoating Via Self-Assembly of Semifluorinated Hyperbranched Amphiphiles, Macromolecular Chemistry and Physics, 2005, 135-141, 206(1), Wiley-VCH Verlag GMBH & Co, KGAA, Germany.
Alexander A. Yarosh, et al., "Synthesis of Water-and-Oil-Repellent Organofluorosilicon Compounds," Mendeleev Commun., 2006, 190-192.

* cited by examiner

*Primary Examiner* — Rei-tsang Shiao
(74) *Attorney, Agent, or Firm* — Erik W. Perez

(57) ABSTRACT

The present invention relates to particles, i.e., oxides of Si, Ti, Zn, Zr, Mn, Al and combinations thereof, where at least one particle has a surface covalently bonded to at least one fluorosilane group. The particle is first bonded to a divalent organic linking group which in turn is bonded to a perfluoroalkyl group. It has been discovered that incorporation of the aforementioned divalent organic linking group can improve the ability of the resulting hydrophobized inorganic particles to impart hydrophobic and oleophobic properties.

13 Claims, 2 Drawing Sheets

SURFACE MODIFIED INORGANIC PARTICLES

BACKGROUND OF THE INVENTION

Inorganic particles hydrophobized with fluorosilanes have been used to impart hydrophobic as well as oleophobic properties as exemplified by U.S. Patent Application, US2006/0222815, filed by Oles et al. which teaches making such hydrophobized particles by the covalent bonding (i.e. grafting) of fluorosilanes upon the surface of inorganic particles (e.g. silica). The fluorosilanes employed by Oles et al. consist of a silicon atom having four bonds, three of which are direct bonds to hydrolysable groups which can react with the surface of an inorganic particle thereby covalently bonding the fluorosilane to particle. The remaining bond is a direct bond from the silicon atom to a perfluoroalkyl group.

Despite the advances of Oles et al., it would be desirable to discover hydrophobized inorganic particles having improved ability to impart hydrophobic as well as oleophobic properties.

BRIEF SUMMARY OF THE INVENTION

Figure 1:
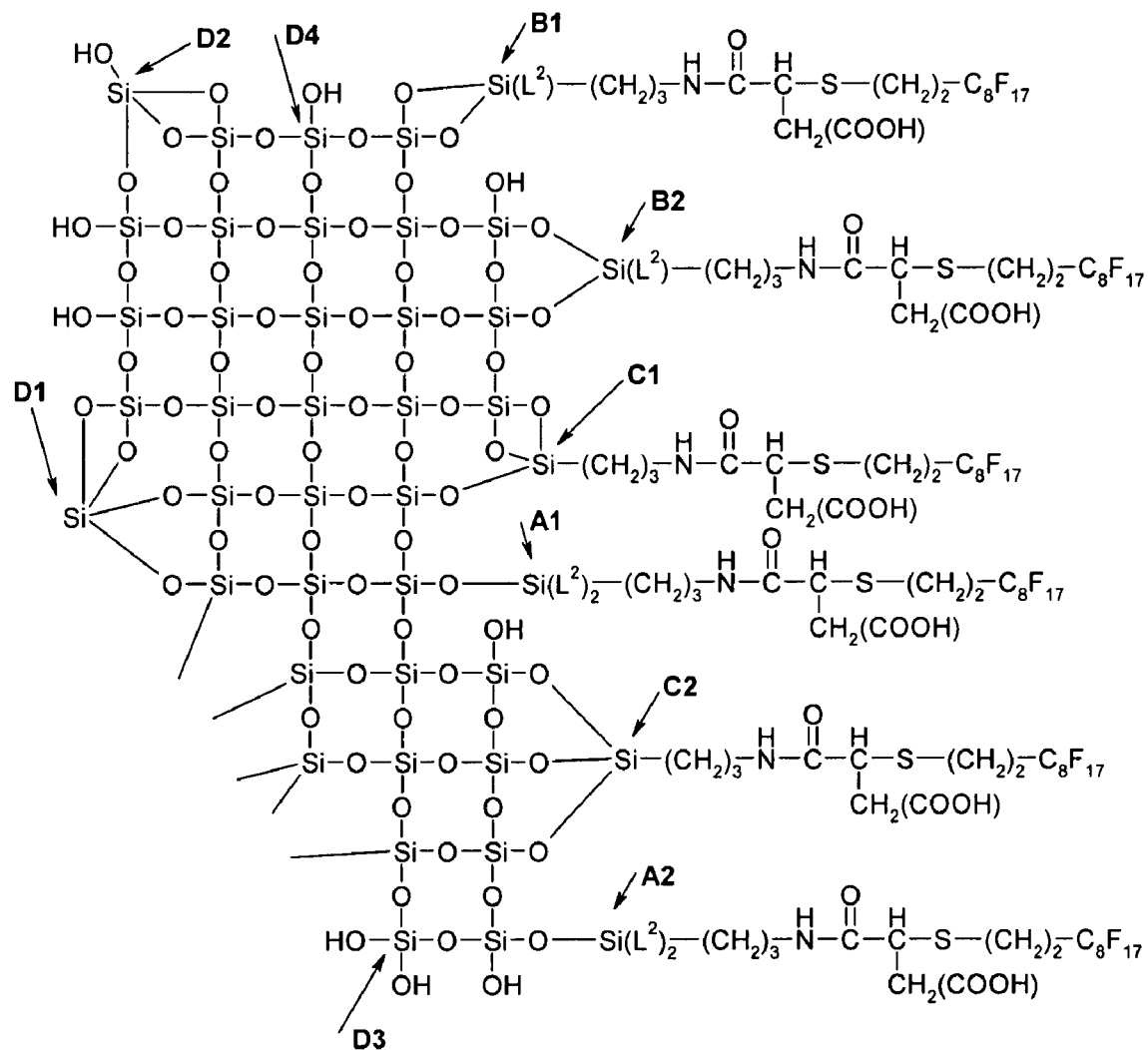
FIG. 1 is a simplified depiction of a hydrophobized particle made from silica particles (AEROSIL 200) obtained in accordance with the invention.

Whereas previously known hydrophobized inorganic particles comprise residues from fluorosilanes wherein the silicon atom is directly bonded to a perfluoroalkyl group, the hydrophobized inorganic particles of the present invention comprise residues from fluorosilanes wherein the silicon atom is first bonded to a divalent organic linking group which in turn is bonded to a perfluoroalkyl group. It has been discovered that incorporation of the aforementioned divalent organic linking group can improve the ability of resulting hydrophobized inorganic particles to impart hydrophobic as well as oleophobic properties.

The present invention relates to surface modified inorganic particles (also known as hydrophobized inorganic particles) made by the method of covalently grafting fluorosilanes to their surface thereby imparting to the particles hydrophobic and/or oleophobic properties. The fluorosilanes used in the present invention have a divalent organic linking group which bonds the silicon atom thereof to a fluorine rich group such as a perfluoroalkyl group. The fluorosilanes useful in the aforementioned method of covalent grafting are described in U.S. patent application Ser. 12/323,593 filed Nov. 26, 2008 hereby incorporated by reference.

Specifically, the surface modified inorganic oxide particles comprise an oxide of M wherein M is independently selected from the group consisting of Si, Ti, Zn, Zr, Mn, Al, and combinations thereof; at least one of said particles having a surface covalently bonded to at least one fluorosilane group represented by Formula (1):

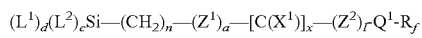

wherein:
$L^1$ represents an oxygen covalently bonded to an M; and each $L^2$ independently selected from the group consisting of H, a $C_1$-$C_2$ alkyl, and OH; d and c are integers such that: $d \geq 1$, $c \geq 0$, $d+c=3$;

each n is independently an integer from 1 to 12;

a, x, and l are integers chosen such that the moiety of Formula 1 represented by $—(Z^1)_a—[C(X^1)]_x—(Z^2)_l—$ further represents at least one of the following moieties:
  i) a first moiety wherein a=1, x=1, and l=1; and
  ii) a second moiety wherein a=1, x=0, and l=0;

$R_f$ is chosen from a $C_2$-$C_{12}$ perfluoroalkyl provided that: i) one fluorine atom of the perfluoroalkyl can be optionally replaced by hydrogen, and/or ii) the perfluoroalkyl can be optionally interrupted by at least one oxygen, methylene, or ethylene;

$Q^1$ is chosen from the group consisting of a $C_2$-$C_{12}$ hydrocarbylene optionally interrupted by at least one divalent organic group;

$X^1$ is chosen from O or S;

the first moiety further defined wherein $Z^1$ and $Z^2$ are chosen such that:
  a) $Z^1$ is —NH— and $Z^2$ is from the group consisting of —NH—, —O—, —S—, —NH—S(O)$_2$—, —N[C(O)H]—, —[HC(COOH)(R$^1$)]CH—S—, and —(R$^1$)CH—[HC(COOH)]—S—;
  b) alternatively, $Z^2$ is —NH— and $Z^1$ is from the group consisting of —O—, and —S—;
  each $R^1$ is independently chosen from hydrogen, phenyl, or a monovalent $C_1$-$C_8$ alkyl optionally terminated by —$C_6H_5$, preferably H or $CH_3$;

the second moiety further defined wherein:
  a) $Z^1$ is —N[-$Q^3$-($R_f$)]—; and
  b) $Q^1$ and $Q^3$ are independently chosen from the group consisting of a $C_2$-$C_{12}$ hydrocarbylene interrupted by at least one of —C(O)—O— or —O—C(O)—, and optionally further interrupted by at least one divalent organic group.

Unless otherwise stated herein the definitions used herein for $L^1$, $L^2$, d, c, n, $Z^1$, $X^1$, $Z^2$, $Q^1$, $Q^3$, $R^1$, and $R_f$ are identical to the definitions set forth above for Formula 1.

In one preferable embodiment, the surface modified inorganic oxide particles comprise at least one particle having a surface covalently bonded to a urea or thiourea fluorosilane group such that in Formula (1):
  a=1, x=1, and l=1;
  $Z^1$ is —NH— and $Z^2$ is —NH—;

said urea or thiourea fluorosilane group represented by the formula:

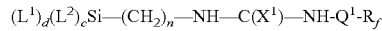

wherein:
$X^1$ is O to form a urea fluorosilane group, or $X^1$ is S to form a thiourea fluorosilane group; and
$Q^1$ is independently chosen from the group consisting of a $C_2$-$C_{12}$ hydrocarbylene optionally interrupted by at least one divalent moiety chosen from the group consisting of —S—, —S(O)—, —S(O)$_2$—, and —O—C(O)—NH—.

In another preferable embodiment, the surface modified inorganic oxide particles comprise at least one particle having a surface covalently bonded to a urea or thiourea fluorosilane group such that $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

In another preferable embodiment, the surface modified inorganic oxide particles comprise at least one particle having a surface covalently bonded to a urea or thiourea fluorosilane group such that $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene;

In another preferable embodiment, the surface modified inorganic oxide particles comprise at least one particle having a surface covalently bonded to a carbamate fluorosilane such that in Formula (1):

$Z^1$ is —NH— and $Z^2$ is —O—, or $Z^1$ is —O— and $Z^2$ is —NH—; and

X is O;

said particle having a surface covalently bonded to an isocyanate derived a carbamate fluorosilane group represented by the formulae:

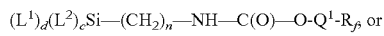

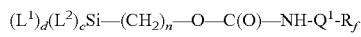

wherein:

$Q^1$ is a $C_2$-$C_{12}$ hydrocarbylene interrupted by at least one divalent moiety chosen from the group consisting of —NH—C(O)—NH—, —NH—C(S)—NH—, —S—, —S(O)—, —S(O)$_2$—, —(R$^1$)N—S(O)$_2$—,

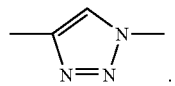

In another preferable embodiment, the surface modified inorganic oxide particles comprise at least one particle having a surface covalently bonded to a carbamate fluorosilane group such that $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

In another preferable embodiment, the surface modified inorganic oxide particles comprise at least one particle having a surface covalently bonded to a carbamate fluorosilane group such that $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

In another preferable embodiment, the surface modified inorganic oxide particles comprise at least one particle having a surface covalently bonded to a thiolcarbamate fluorosilane group such that in Formula (1):

$Z^1$ is —NH— and $Z^2$ is —S—, or $Z^1$ is —S— and $Z^2$ is —NH—; and $X^1$ is O;

said thiolcarbamate fluorosilane group represented by the formulae:

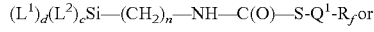

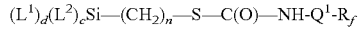

wherein:

$Q^1$ is independently chosen from the group consisting of a $C_2$-$C_{12}$ hydrocarbylene optionally interrupted by at least one divalent moiety chosen from the group consisting of —S—, —S(O)—, —S(O)$_2$—, —N(R$^1$)—C(O)—, —C(O)—N(R$^1$)—, —(R$^1$)N—S(O)$_2$—, and

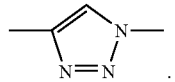

In another preferable embodiment, the surface modified inorganic oxide particles comprise at least one particle having a surface covalently bonded to a thiolcarbamate fluorosilane group such that $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

In another preferable embodiment, the surface modified inorganic oxide particles comprise at least one particle having a surface covalently bonded to a thiolcarbamate fluorosilane group such that $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

In another preferable embodiment, the surface modified inorganic oxide particles comprise at least one particle having a surface covalently bonded to a N-sulfone urea fluorosilane group such that in Formula (1):

$Z^1$ is —NH—, and $Z^2$ is —NH—S(O)$_2$—; and

X is O;

said N-sulfone urea fluorosilane group represented by the formula:

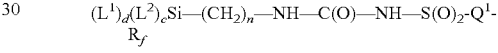

wherein:

$Q^1$ is independently chosen from the group consisting of an uninterrupted $C_2$-$C_{12}$ hydrocarbylene.

In another preferable embodiment, the surface modified inorganic oxide particles comprise at least one particle having a surface covalently bonded to a N-formyl urea fluorosilane group such that in Formula (1):

a=1, x=1, and l=1; and $Z^1$ is —NH—, and $Z^2$ is —N[C(O)H]—;

said N-formyl urea group represented by the formula:

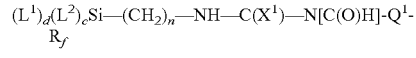

wherein:

$Q^1$ is independently chosen from the group consisting of a $C_2$-$C_{12}$ hydrocarbylene interrupted by at least one divalent moiety chosen from the group consisting of —S— and —NH—.

In another preferable embodiment, the surface modified inorganic oxide particles comprise at least one particle having a surface covalently bonded to a thioether succinamic acid fluorosilane group such that in Formula (1):

a=1, x=1, and l=1;

$Z^1$ is —NH— and $Z^2$ is —[HC(COOH)(R$^1$)]CH—S— or —(R$^1$)CH—[HC(COOH)]—S—;

$X^1$ is O; and $Q^1$ is —(CH$_2$)$_2$— said thioether succinamic acid group represented by the formulae:

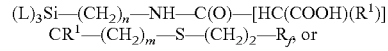

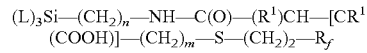

wherein m is 1 or 0; wherein each R$^1$ is independently chosen from methyl or hydrogen preferably H.

In another preferable embodiment, the surface modified inorganic oxide particles comprise at least one particle having a surface covalently bonded to a tertiary amine fluorosilane group such that in Formula (1):

a=1, x=0, and l=0; and $Z^1$ is —N[-$Q^3$-($R_f$)]—;

said tertiary amine fluorosilane group represented by the formula:

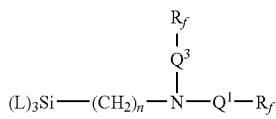

wherein $Q^1$ and $Q^3$ is independently chosen from the group consisting of a $C_2$-$C_{12}$ hydrocarbylene interrupted by at least one —C(O)—O— and optionally further interrupted by at least one divalent moiety chosen from the group consisting of —S—, —S(O)—, —S(O)$_2$—, —N($R^1$)—C(O)—, —C(O)—N($R^1$)—, —($R^1$)N—S(O)$_2$—, and

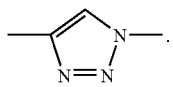

DETAILED DESCRIPTION OF THE INVENTION

The hydrophobized inorganic particles of the present invention can be made by covalently grafting fluorosilanes to their surface in order to impart to them both hydrophobic and oleophobic properties. The fluorosilanes used in the present invention have a divalent organic linking group which connects the silicon atom to a fluorine rich group such as a perfluoroalkyl group. Fluorosilanes useful for the invention have at least one hydrolysable group which reacts with the surface of an inorganic particle thereby creating a covalent bond between the fluorosilane and the inorganic particle. Fluorosilanes that are useful in the present invention are also known as fluoroalkyl silanes which are further described in U.S. patent application Ser. No. 12/323,593 filed Nov. 26, 2008 hereby incorporated by reference.

The hydrophobized inorganic particles of the present invention can be made by dispersing inorganic particles in a non-polar solvent (e.g. toluene) and adding to this dispersion the desired fluorosilane. The dispersion is then heated to an elevated temperature (e.g. 80-100° C.) for about 8-10 hours. The dispersion is then allowed to cool to ambient temperature (about 20° C.). The dispersion is then placed in a centrifuge, the solvent is decanted, and the resulting inorganic particles are washed with fresh solvent. Washing is preferably done at least twice. The washed inorganic particles are then dried in an oven at elevated temperature (about 100-110° C.). The resulting dried inorganic particles are the final product of the invention. However, the resulting dried inorganic particles can be re-dispersed in a non-polar solvent (e.g. toluene) and additional fluorosilane can be added to this dispersion by repeating the entire procedure described in this paragraph.

The procedure for making hydrophobized inorganic particles in the preceding paragraph is preferable and is known as the "convergent" approach. Alternatively, some of the hydrophobized inorganic particles of the present invention can also be made via a "divergent" approach wherein "functionalized inorganic particles" are made by reacting untreated inorganic particles with a first precursor wherein the first precursor comprises a silicon atom bonded to at least one terminal hydrolysable group which reacts with the surface of the inorganic particle thereby creating a covalent bond between the first precursor and the inorganic particle. The first precursor further comprises a terminal reactive group (e.g. an amine or an isocyante derived from an amine or an isothiocyanate derived an amine) thereby creating functionalized inorganic particles having "anchors" which comprise the terminal reactive group. These functionalized inorganic particles are then reacted with a second precursor wherein the second precursor comprises a corresponding reactive group (e.g. a terminal amine, an isocyante, an isothiocyanate, vinyl, sulfonyl chloride, or sulfonamide) capable of reacting with the terminal reactive group of the "anchors." The second precursor is also known herein by the term "capping agent." An example of a useful first precursor and second precursor combination is wherein the first precursor comprises a terminal amine group and the second precursor comprises a terminal isocyante, isothiocyanate, vinyl, sulfonyl chloride, or sulfonamide.

Inorganic particles useful to the invention include any inorganic particles that have reactive groups on the surface thereof wherein such groups are capable of reacting with the hydrolysable groups of the fluorosilanes (or precursors thereof) of the invention thereby creating a covalent bond between the inorganic particle and the fluorosilane (or precursor thereof). Particularly useful inorganic particles are oxides, such as oxides of silicon, titanium, zinc, zirconium, manganese, and aluminum.

As stated earlier, the "convergent" approach is preferable for making the hydrophobized inorganic particles of the invention. Fluorosilanes useful in the convergent approach are represented by

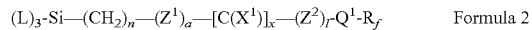 Formula 2 wherein:

each n is independently an integer from 1 to 12;

a, x, and l are integers chosen such that the moiety of Formula 2 represented by —($Z^1$)$_a$—[C($X^1$)]$_x$—($Z^2$)$_l$— further represents at least one of the following moieties:

i) a first moiety wherein a=1, x=1, and l=1; and ii) a second moiety wherein a=1, x=0, and l=0;

L is independently chosen from a hydrolysable or non-hydrolysable monovalent group $R_f$ is chosen from a $C_2$-$C_{12}$ perfluoroalkyl provided that: i) one fluorine atom of the perfluoroalkyl can be optionally replaced by hydrogen, and/or ii) the perfluoroalkyl can be optionally interrupted by at least one oxygen, methylene, or ethylene;

$Q^1$ is chosen from the group consisting of a $C_2$-$C_{12}$ hydrocarbylene optionally interrupted by at least one divalent organic group;

$X^1$ is chosen from O or S;

the first moiety further defined wherein $Z^1$ and $Z^2$ are chosen such that:

a) $Z^1$ is —NH— and $Z^2$ is from the group consisting of —NH—, —O—, —S—, —NH—S(O)$_2$—, —N[C(O)H]—, —[HC(COOH)($R^1$)]CH—S—, and —($R^1$)CH—[HC(COOH)]—S—;

b) alternatively, $Z^2$ is —NH— and $Z^1$ is from the group consisting of —O—, and —S—;

c) when $Z^1$ or $Z^2$ is O, $Q^1$ is interrupted by at least one divalent moiety chosen from the group consisting of —S—, —S(O)—, —S(O)$_2$—, —N$R^1$—S(O)$_2$—, —N(CH)$_3$S(O)$_2$—, and

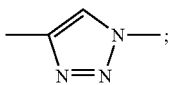

d) each $R^1$ is independently chosen from hydrogen, phenyl, or a monovalent $C_1$-$C_8$ alkyl optionally terminated by —$C_6H_5$, preferably H or $CH_3$;

the second moiety further defined wherein:
a) $Z^1$ is —N(-$Q^3$-$R_f$); and
b) $Q^1$ and $Q^3$ are independently chosen from the group consisting of a $C_2$-$C_{12}$ hydrocarbylene interrupted by at least one of —C(O)—O— or —O—C(O)—, and optionally further interrupted by at least one divalent organic group.

A preferred fluorosilane of Formula 2 is an isocyanate derived fluorosilane being a urea or thiourea fluorosilane wherein:

$Z^1$ and $Z^2$ are both —NH—;
said urea or thiourea represented by the formula:

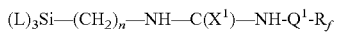

wherein:
$X^1$ is O to form a urea fluorosilane, or $X^1$ is S to form a thiourea fluorosilane; and
$Q^1$ is independently chosen from the group consisting of a $C_2$-$C_{12}$ hydrocarbylene optionally interrupted by at least one divalent moiety chosen from the group consisting of —S—, —S(O)—, —S(O)$_2$—, and —O—C(O)—NH—.

A preferred urea or thiourea fluorosilane is one wherein $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

A preferred urea or thiourea fluorosilane is one wherein $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

Another preferred isocyanate derived fluorosilane of Formula 2 is a carbamate fluorosilane wherein:
$Z^1$ is —NH— and $Z^2$ is —O—, or $Z^1$ is —O— and $Z^2$ is —NH—; and
$X^1$ is O;
said carbamate represented by the formulae:

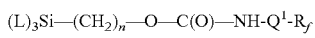

wherein:
$Q^1$ is a $C_2$-$C_{12}$ hydrocarbylene interrupted by at least one divalent moiety chosen from the group consisting of —NH—C(O)—NH—, —NH—C(S)—NH—, —S—, —S(O)—, —S(O)$_2$—, —($R^1$)N—S(O)$_2$—,

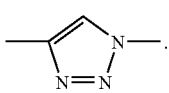

A preferred carbamate fluorosilane is one wherein $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

A preferred carbamate fluorosilane is one wherein $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

Another preferred isocyanate derived fluorosilane of Formula 2 is a thiolcarbamate fluorosilane wherein:
$Z^1$ is —NH— and $Z^2$ is —S—, or $Z^1$ is —S— and $Z^2$ is —NH—; and
$X^1$ is O;
said carbamate represented by the formulae:

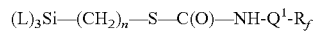

wherein:
$Q^1$ is independently chosen from the group consisting of a $C_2$-$C_{12}$ hydrocarbylene optionally interrupted by at least one divalent moiety chosen from the group consisting of —S—, —S(O)—, —S(O)$_2$—, —N($R^1$)—C(O)—, —C(O)—N($R^1$)—, —($R^1$)N—S(O)$_2$—, and

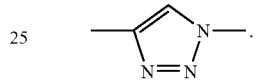

A preferred thiolcarbamate fluorosilane is one wherein $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

A preferred thiolcarbamate fluorosilane is one wherein $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

Another preferred isocyanate derived fluorosilane of Formula 2 is a N-sulfone urea fluorosilane wherein:
$Z^1$ is —NH—, and $Z^2$ is —NH—S(O)$_2$—; and
$X^1$ is O;
said N-sulfone urea represented by the formula:

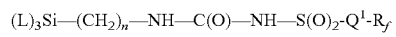

wherein:
$Q^1$ is independently chosen from the group consisting of an uninterrupted $C_2$-$C_{12}$ hydrocarbylene.

Another preferred isocyanate derived fluorosilane of Formula 2 is a N-formyl urea fluorosilane wherein:
a=1, x=1, and l=1; and
$Z^1$ is —NH—, and $Z^2$ is —N[C(O)H]—;
said N-formyl urea represented by the formula:

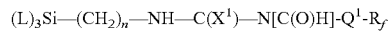

wherein:
$Q^1$ is independently chosen from the group consisting of a $C_2$-$C_{12}$ hydrocarbylene interrupted by at least one divalent moiety chosen from the group consisting of —S— and —NH—.

Another preferred fluorosilane of Formula 2 is a thioether succinamic acid fluorosilane wherein:
a=1, x=1, and l=1;
$Z^1$ is —NH— and $Z^2$ is —[HC(COOH)($R^1$)]CH—S— or —($R^1$)CH—[HC(COOH)]—S—;
$X^1$ is O; and $Q^1$ is —(CH$_2$)$_2$— said thioether succinamic acid represented by the formulae:

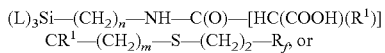

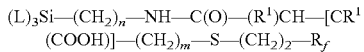

wherein m is 1 or 0, preferably 0, wherein each $R^1$ is independently chosen from methyl or hydrogen preferably H.

Another preferred fluorosilane of Formula 2 is a tertiary amine fluorosilane wherein:

a=1, x=0, and l=0; and $Z^1$ is —N[-Q³-($R_f$)]—;

said tertiary amine represented by the formula:

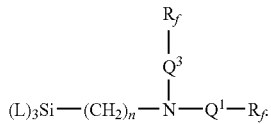

$Q^1$ and $Q^3$ is independently chosen from the group consisting of a $C_2$-$C_{12}$ hydrocarbylene interrupted by at least one —C(O)—O— and optionally further interrupted by at least one divalent moiety chosen from the group consisting of —S—, —S(O)—, —S(O)$_2$—, —N($R^1$)—C(O)—, —C(O)—N($R^1$)—, —($R^1$)N—S(O)$_2$—, and

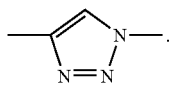

EXAMPLES

The following inorganic particles were used as indicated in the examples below.

TABLE 1

| Name of Inorganic Oxide | Description of Inorganic Oxide |
|---|---|
| SiO$_2$ #1 | Silica having a primary particle size of about 12 nm obtained as AEROSIL 200 from Degussa AG now Evonik Degussa Industries AG. |
| ZnO #1 | Zinc oxide nanopowder having a primary particle size of about 50-70 nm obtained from Sigma-Aldrich Corporation |
| TiSiO$_4$ #1 | Silica coated titanium oxide nanopowder having a primary particle size of about 100 nm from Sigma-Aldrich Corporation. |
| SiO$_2$ #2 | Silica having a primary particle size of about 7 nm obtained as AEROSIL 300 from Degussa AG now Evonik Degussa Industries AG. |
| SiO$_2$ #3 | Silica having a primary particle size of about 20 nm obtained as AEROSIL 90 from Degussa AG now Evonik Degussa Industries AG. |

TABLE 1-continued

| Name of Inorganic Oxide | Description of Inorganic Oxide |
|---|---|
| SiO$_2$ #4 | Silica having a primary particle size of about 40 nm obtained as OX50 from Degussa AG now Evonik Degussa Industries AG. |
| SiO$_2$ #5 | Silica having an average particle size of about 11000 nm obtained as SPHERICEL 110P8 from Potters Industries Inc. |
| SiO$_2$ #6 | Silica having an average particle size of about 7000 nm obtained as SPHERIGLASS 5000 from Potters Industries Inc. |

The following fluorosilanes were used as indicated in the examples below.

TABLE 2

| Name of Fluorosilane | Description of Fluorosilane |
|---|---|
| FS #A | (CH$_3$O)$_3$Si—(CH$_2$)$_2$—(CF$_2$)$_5$—CF$_3$ |
| FS #B | (CH$_3$O)$_3$Si—(CH$_2$)$_2$—(CF$_2$)$_7$—CF$_3$ |
| FS #C | (CH$_3$O)$_3$Si—(CH$_2$)$_3$—C$_6$F$_5$ |
| FS #1 | (CH$_3$O)$_3$Si—(CH$_2$)$_3$—NH—C(O)—NH—(CH$_2$)$_2$—S—(CH$_2$)$_2$—(CF$_2$)$_5$—CF$_3$ |

Convergent Fluorosilane Single Grafting

The term "convergent fluorosilane single grafting" as used throughout the examples refers to the following procedure. About 125 g of a chosen inorganic oxide was placed in a 3 liter round bottom flask equipped with a mechanical stirrer and under nitrogen atmosphere. The stirred mixture was heated to about 50° C. for about 2 hours in order to achieve a homogeneous dispersion. 25 g of a chosen fluorinated silane was then quickly added to the stirred mixture followed by nitrogen sparging for 30 minutes. The reaction mixture temperature was then raised to 75° C. and stirred for about 15 hours under a nitrogen atmosphere. After this allotted reaction time period, the reaction mixture was cooled and centrifuged in portions at 3000 rpm for about 2 minutes. Excess hydrocarbon solvent was decanted and the remaining fluorine grafted fumed inorganic oxide product were washed 3 times with ethanol and centrifuged followed by drying in a vacuum oven at 110° C. for about 12 hours.

Convergent Fluorosilane Double Grafting

The term "convergent fluorosilane double grafting" as used throughout the examples refers to a procedure identical to "convergent fluorosilane single grafting" with the following additional steps. About 125 g the inorganic oxide product obtained after a convergent fluorosilane double grafting was placed in a 3 liter round bottom flask equipped with a mechanical stirrer and under nitrogen atmosphere. The stirred mixture was heated to about 50° C. for about 2 hours in order to achieve a homogeneous dispersion. 25 g of the same fluorinated silane used in the convergent fluorosilane single grafting was then quickly added to the stirred mixture followed by nitrogen sparging for 30 minutes. The reaction mixture temperature was then raised to 75° C. and stirred for about 15 hours under a nitrogen atmosphere. After the allotted reaction time period, the reaction mixture was cooled and centrifuged in portions at 3000 rpm for about 2 minutes. Excess hydrocarbon solvent was decanted and the remaining fluorine double grafted fumed inorganic oxide product were washed 3 times with ethanol and centrifuged followed by drying in a vacuum oven at 110° C. for about 12 hours.

Thin Film Casting

The term "thin film casting" as used throughout the examples refers to the following procedure. About 5 wt. % of chosen hydrophobized inorganic particles or untreated inorganic particles were dispersed in isopropanol. A thin film was made by casting three layers of this solution onto a clean glass slides wherein the slide were allowed to dry for about 10 minutes at 60° C. after each casting thereby creating a homogenous coating of particles on the glass slides.

Advancing Water Contact Angle Measurement ("$H_2O$ Adv.")

The terms "advancing water contact angle" or "$H_2O$ Adv." refer to the results of a measurement conducted using a Ramé-Hart Standard Automated Goniometer Model 200 employing DROP image standard software and equipped with an automated dispensing system with 250 µl syringe, having an illuminated specimen stage assembly. A sample was glued to a glass slide using double-sided tape. The goniometer, which is connected through an interface to a computer with computer screen, had an integral eye piece connected to a camera having both horizontal axis line indicator and an adjustable rotating cross line and angle scale, both independently adjustable by separate verniers. The syringe used were carefully cleaned with alcohol and allowed to dry completely before use.

Prior to contact angle measurement, the sample on the glass slide was clamped into place and the vertical vernier adjusted to align the horizontal line (axis) of the eye piece coincident to the horizontal plane of the sample, and the horizontal position of the stage relative to the eye piece positioned so as to view one side of the test fluid droplet interface region at the sample interface.

To determine the contact angle of the test fluid on the sample, approximately one drop of test fluid was dispensed onto the sample using a small syringe fitted with a stainless steel needle and a micrometer drive screw to displace a calibrated amount of the test fluid, which was deionized water.

Horizontal and cross lines were adjusted via the software in the Model 200 after leveling the sample via stage adjustment, and the computer calculated the contact angle based upon modeling the drop appearance. Alternatively, immediately upon dispensing the test fluid, the rotatable vernier was adjusted to align the cross line and cross position, that is the intersection of the rotatable cross line and the fixed horizontal line, coincident with the edge of the test fluid droplet and the sample, and the cross line angle (rotation) then positioned coincident with the tangent to the edge of the test droplet surface, as imaged by the eye piece. The contact angle was then read from the angle scale, which was equivalent to the tangent angle.

Contact angle was measured after the droplet has been added to a surface.

Receding Water Contact Angle Measurement ("$H_2O$ Rec.")

The terms "receding water contact angle" or "$H_2O$ Rec." refer to the results of a measurement identical to the advancing water contact angle measurement described above except contact angle was measured after the droplet was partially withdrawn from a surface.

Advancing Oil Contact Angle Measurement ("$C_{16}H_{12}$ Adv.")

The terms "advancing oil contact angle" or "$C_{16}H_{12}$ Adv." refer to the results of a measurement identical to the advancing water contact angle measurement described above except hexadecane was used as the test liquid instead of water.

Receding Oil Contact Angle Measurement ("$C_{16}H_{12}$ Rec.")

The terms "receding oil contact angle" or "$C_{16}H_{12}$ Rec." refer to the results of a measurement identical to the advancing oil contact angle measurement described above except contact angle was measured after the droplet was partially withdrawn from a surface.

Evaluation of Contact Angle

Higher advancing and/or receding water contact angle measurements indicated higher water repellency while lower water contact angles measurements indicated lower water repellency. Cases where no water contact angle could be measured indicate wetting and very poor water repellency. Higher advancing and/or receding oil contact angle measurements indicated higher oil repellency while lower oil contact angles measurements indicated lower oil repellency. Cases where no oil contact angle could be measured indicate wetting and very poor oil repellency. A surface is said to be "super hydrophobic" in cases where the advancing water contact angle and receding water contact angle was greater than about 150 degrees and the hysteresis (difference between advancing and receding water contact angle) is less than about 10 degrees. A surface is said to be "super oleophobic" in cases where the advancing oil contact angle and receding oil contact angle was greater than about 150 degrees and the hysteresis (difference between advancing and receding oil contact angle) is less than about 10 degrees. A surface that is both super hydrophobic and super oleophobic is said to be "super amphiophobic."

Weight Percent Fluorine Measurement

The percent fluorine in any given hydrophobized particle was determined by the Wickbold Torch method and are shown in the tables below under a column labeled "% F."

Untreated Control Example

Using thin film casting, eight films were made respectively from $SiO_2$ #1, ZnO #1, $TiSiO_4$ #1, $SiO_2$ #2, $SiO_2$ #3, $SiO_2$ #4, $SiO_2$ #5, $SiO_2$ #6. The water and oil contact angles (advancing and receding) were measured for each of these eight films. In all eight cases, no water or oil contact angles could be measured which indicated wetting and very poor water and oil repellency.

Comparative Example A

Convergent fluorosilane single grafting was conducted wherein the chosen inorganic oxide was $SiO_2$ #1 and the chosen fluorosilane was FS #A resulting in hydrophobized particles. A film sample was made by thin film casting using these hydrophobized particles. Contact angle measurements were conducted on this film sample and are shown in Table 3.

Comparative Example B

Convergent fluorosilane single grafting was conducted wherein the chosen inorganic oxide was $SiO_2$ #1 and the chosen fluorosilane was FS #B. A film sample was made by thin film casting using these hydrophobized particles. Contact angle measurements were conducted on this film sample and are shown in Table 3.

Comparative Example C

Convergent fluorosilane single grafting was conducted wherein the chosen inorganic oxide was $SiO_2$ #1 and the chosen fluorosilane was FS #C. A film sample was made by thin film casting using these hydrophobized particles. Contact angle measurements were conducted on this film sample and are shown in Table 3.

Example 1

Convergent fluorosilane single grafting was conducted wherein the chosen inorganic oxide was $SiO_2$ #1 and the chosen fluorosilane was FS #1. A film sample was made by thin film casting using these hydrophobized particles. Contact angle measurements were conducted on this film sample and are shown in Table 3.

Example 2

Convergent fluorosilane single grafting was conducted wherein the chosen inorganic oxide was ZnO #1 and the chosen fluorosilane was FS #1. A film sample was made by thin film casting using these hydrophobized particles. Contact angle measurements were conducted on this film sample and are shown in Table 3.

Example 3

Convergent fluorosilane single grafting was conducted wherein the chosen inorganic oxide was TiSiO$_4$ #1 and the chosen fluorosilane was FS #1. A film sample was made by thin film casting using these hydrophobized particles. Contact angle measurements were conducted on this film sample and are shown in Table 3.

Comparative Example D

Convergent fluorosilane double grafting was conducted wherein the chosen inorganic oxide was SiO$_2$ #1 and the chosen fluorosilane was FS #A resulting in hydrophobized particles. A film sample was made by thin film casting using these hydrophobized particles. Contact angle measurements were conducted on this film sample and are shown in Table 3.

Comparative Example E

Convergent fluorosilane double grafting was conducted wherein the chosen inorganic oxide was SiO$_2$ #1 and the chosen fluorosilane was FS #B. A film sample was made by thin film casting using these hydrophobized particles. Contact angle measurements were conducted on this film sample and are shown in Table 3.

Comparative Example F

Convergent fluorosilane double grafting was conducted wherein the chosen inorganic oxide was SiO$_2$ #1 and the chosen fluorosilane was FS #C. A film sample was made by thin film casting using these hydrophobized particles. Contact angle measurements were conducted on this film sample and are shown in Table 3.

Example 4

Convergent fluorosilane double grafting was conducted wherein the chosen inorganic oxide was SiO$_2$ #1 and the chosen fluorosilane was FS #1. A film sample was made by thin film casting using these hydrophobized particles. Contact angle measurements were conducted on this film sample and are shown in Table 3.

Example 5

Convergent fluorosilane double grafting was conducted wherein the chosen inorganic oxide was ZnO #1 and the chosen fluorosilane was FS #1. A film sample was made by thin film casting using these hydrophobized particles. Contact angle measurements were conducted on this film sample and are shown in Table 3.

Example 6

Convergent fluorosilane double grafting was conducted wherein the chosen inorganic oxide was TiSiO$_4$ #1 and the chosen fluorosilane was FS #1. A film sample was made by thin film casting using these hydrophobized particles. Contact angle measurements were conducted on this film sample and are shown in Table 3.

TABLE 3

| Example | | Inorganic Oxide Particle | % F | Fluorosilane | Contact Angle Measurements (°) | | | |
|---|---|---|---|---|---|---|---|---|
| | | | | | $H_2O$ Adv. | $H_2O$ Rec. | $C_{16}H_{12}$ Adv. | $C_{16}H_{12}$ Rec. |
| single grafting | A | SiO$_2$ #1 | 4.49 | FS #A | 145 | 126 | * | * |
| | B | SiO$_2$ #1 | 6.71 | FS #B | 159 | 156 | * | * |
| | C | SiO$_2$ #1 | 2.87 | FS #C | 149 | 129 | * | * |
| | 1 | SiO$_2$ #1 | 13.6 | FS #1 | 81 | 80 | 105 | 92 |
| | 2 | ZnO #1 | 3.09 | FS #1 | 124 | 107 | 80 | 62 |
| | 3 | TiSiO$_4$ #1 | 18.0 | FS #1 | 160 | 157 | * | * |
| double grafting | D | SiO$_2$ #1 | 5.51 | FS #A | 153 | 149 | * | * |
| | E | SiO$_2$ #1 | 12.8 | FS #B | 158 | 155 | * | * |
| | 4 | SiO$_2$ #1 | 22.1 | FS #1 | 160 | 158 | 155 | 150 |
| | 5 | ZnO #1 | 5.75 | FS #1 | 161 | 161 | 98 | 72 |
| | 6 | TiSiO$_4$ #1 | 11.2 | FS #1 | 161 | 161 | 154 | 149 |

* indicates contact angle could not be measure because of wetting

In reference to Table 3 above, the fluorosilane used in Comparative Examples A-E is a fluorosilane wherein the silicon atom is directly bonded to a perfluoroalkyl group. In contrast, that the fluorosilane used in Examples 1-6 is a fluorosilane wherein the silicon atom is first bonded to a divalent organic linking group, represented by —NH—C(O)—NH—(CH$_2$)$_2$—S—(CH$_2$)$_2$—, which in turn is bonded to a perfluoroalkyl group. As shown by comparing the contact angle measurements of Example 1 to Comparative Examples A-C, without the incorporation of a divalent organic linking group it was only possible to achieve adequate water repellency but impossible to also achieve adequate oil repellency. The incorporation of a divalent organic linking group in Example 1 results in adequate water repellency as well as adequate oil repellency. Even when double grafting is performed such as in Comparative Examples D-E, without the incorporation of a divalent organic linking group it was only possible to achieve adequate water repellency but impossible to also achieve adequate oil repellency. Table 3 also shows that double grafting improves oil repellency over single grafting as evidenced by comparing: Example 1 to Example 4; Example 2 to Example 5; and Example 3 to Example 6.

Divergent Synthesis—Single Functionalization

The term "single functionalization" as used throughout the examples refers to the following procedure. About 125 g of a chosen inorganic oxide was placed in a 3 liter round bottom flask equipped with a mechanical stirrer and under nitrogen atmosphere. The stirred mixture was heated to about 50° C. for about 2 hours in order to achieve a homogeneous dispersion. 25 g of a first precursor, $(CH_3O)_3Si$—$(CH_2)_3$—$NH_2$ (commercially available as AMMO from Degussa AG), was then quickly added to the stirred mixture followed by nitrogen sparging for 30 minutes. The reaction mixture temperature was then raised to 75° C. and stirred for about 15 hours. After the allotted reaction time period, the reaction mixture was cooled and centrifuged in portions at 3000 rpm for about 2 minutes. Excess hydrocarbon solvent was decanted and the remaining fluorine grafted fumed inorganic oxide product were washed 3 times with ethanol and centrifuged followed by drying in a vacuum oven at 110° C. for about 12 hours. All of the above steps were preformed in a nitrogen atmosphere.

Divergent Synthesis—Double Functionalization

The term "double functionalization" as used throughout the examples refers to a procedure identical to "single functionalization" with the following additional steps. About 125 g of the inorganic oxide product obtained after single functionalization was placed in a 3 liter round bottom flask equipped with a mechanical stirrer and under nitrogen atmosphere. The stirred mixture was heated to about 50° C. for about 2 hours in order to achieve a homogeneous dispersion. 25 g of the first precursor, $(CH_3O)_3Si$—$(CH_2)_3$—$NH_2$ (commercially available as AMMO from Degussa AG), was then quickly added to the stirred mixture followed by nitrogen sparging for 30 minutes. The reaction mixture temperature was then raised to 75° C. and stirred for about 15 hours. After the allotted reaction time period, the reaction mixture was cooled and centrifuged in portions at 3000 rpm for about 2 minutes. Excess hydrocarbon solvent was decanted and the remaining fluorine double grafted fumed inorganic oxide product were washed 3 times with ethanol and centrifuged followed by drying in a vacuum oven at 110° C. for about 12 hours. All of the above steps were preformed in a nitrogen atmosphere.

Comparative Example F

Single functionalization was conducted wherein the chosen inorganic oxide was $SiO_2$ #2 resulting in treated particles. A film sample was made by thin film casting using these treated particles. Contact angle measurements were conducted on this film sample and are shown in Table 4.

Comparative Example G

Single functionalization was conducted wherein the chosen inorganic oxide was $SiO_2$ #1 resulting in treated particles. A film sample was made by thin film casting using these treated particles. Contact angle measurements were conducted on this film sample and are shown in Table 4.

Comparative Example H

Single functionalization was conducted wherein the chosen inorganic oxide was $SiO_2$ #3 resulting in treated particles. A film sample was made by thin film casting using these treated particles. Contact angle measurements were conducted on this film sample and are shown in Table 4.

Comparative Example I

Single functionalization was conducted wherein the chosen inorganic oxide was $SiO_2$ #4 resulting in treated particles. A film sample was made by thin film casting using these treated particles. Contact angle measurements were conducted on this film sample and are shown in Table 4.

Comparative Example J

Single functionalization was conducted wherein the chosen inorganic oxide was $SiO_2$ #5 resulting in treated particles. A film sample was made by thin film casting using these treated particles. Contact angle measurements were conducted on this film sample and are shown in Table 4.

Comparative Example K

Double functionalization was conducted wherein the chosen inorganic oxide was $SiO_2$ #6 resulting in treated particles. A film sample was made by thin film casting using these treated particles. Contact angle measurements were conducted on this film sample and are shown in Table 4.

Comparative Example L

Double functionalization was conducted wherein the chosen inorganic oxide was $SiO_2$ #1 resulting in treated particles. A film sample was made by thin film casting using these treated particles. Contact angle measurements were conducted on this film sample and are shown in Table 4.

TABLE 4

| Example | Inorganic Oxide Particle | % F | Contact Angle Measurements (°) | | | |
|---|---|---|---|---|---|---|
| | | | $H_2O$ Adv. | $H_2O$ Rec. | $C_{16}H_{12}$ Adv. | $C_{16}H_{12}$ Rec. |
| F | $SiO_2$ #2 | 0 | 26 | 25 | * | * |
| G | $SiO_2$ #1 | 0 | 27 | 23 | 17 | 11 |
| H | $SiO_2$ #3 | 0 | * | * | * | * |
| I | $SiO_2$ #4 | 0 | * | * | * | * |
| J | $SiO_2$ #5 | 0 | 40 | 14 | 36 | 21 |
| K | $SiO_2$ #6 | 0 | * | * | * | * |
| L | $SiO_2$ #1 | 0 | 4 | * | * | * |

* indicates contact angle could not be measure because of wetting

In reference to Table 4 above, it was shown that single functionalization or double functionalization does not result in adequate water or oil repellency.

Capping Step

The term "capping step" as used throughout the examples refers to the following procedure. Inorganic particles obtained after single functionalization or after double functionalization are reacted with a chosen "capping agent" in an inert environment in toluene solvent. When the capping agent was a succinic anhydride,

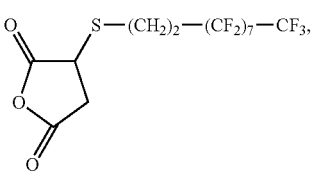

the capping agent was synthesized in toluene and immediately reacted with the inorganic particles obtained after single functionalization or after double functionalization. Synthesis of the succinic anhydride was conducted as taught in U.S. Pat. No. 4,171,282 hereby incorporated by reference.

Example 7

Single functionalization was conducted wherein the chosen inorganic oxide was SiO$_2$ #2 resulting in treated particles. These treated particles wherein subjected to the capping step wherein the chosen capping agent was

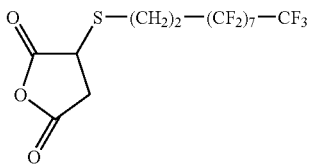

thereby making hydrophobized particles. A film sample was made by thin film casting using these hydrophobized particles. Contact angle measurements were conducted on this film sample and are shown in Table 5. The resulting fluorosilane residue on these hydrophobized particles was

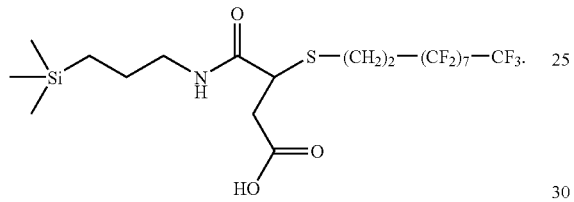

The symbol

represents three covalent bonds from silicon, at least one of which is bonded to the particle surface.

Example 8

Example 7 was repeated except the chosen inorganic oxide was SiO$_2$ #1.

Example 9

Example 7 was repeated except the chosen inorganic oxide was SiO$_2$ #3.

Example 10

Example 7 was repeated except the chosen inorganic oxide was SiO$_2$ #4.

Example 11

Example 7 was repeated except the chosen inorganic oxide was SiO$_2$ #5.

Example 12

Example 7 was repeated except the chosen inorganic oxide was SiO$_2$ #6.

Example 13

Double functionalization was conducted wherein the chosen inorganic oxide was SiO$_2$ #2 resulting in treated particles. These treated particles wherein subjected to the capping step wherein the chosen capping agent was

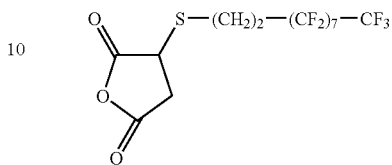

thereby making hydrophobized particles. A film sample was made by thin film casting using these hydrophobized particles. Contact angle measurements were conducted on this film sample and are shown in Table 5. The resulting fluorosilane residue on these hydrophobized particles was

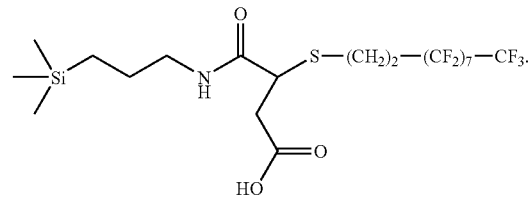

The symbol

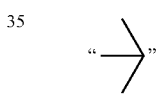

represents three covalent bonds from silicon, at least one of which is bonded to the particle surface.

Example 14

Example 13 was repeated except the chosen inorganic oxide was SiO$_2$ #1.

TABLE 5

| | Inorganic | | Contact Angle Measurements (°) | | | |
|---|---|---|---|---|---|---|
| Example | Oxide Particle | % F | H$_2$O Adv. | H$_2$O Rec. | C$_{16}$H$_{12}$ Adv. | C$_{16}$H$_{12}$ Rec. |
| 7 | SiO$_2$ #2 | 10.7 | 158 | 155 | * | * |
| 8 | SiO$_2$ #1 | 13.5 | 159 | 159 | 140 | 126 |
| 9 | SiO$_2$ #3 | 6.23 | 159 | 157 | 34 | 16 |
| 10 | SiO$_2$ #4 | 1.66 | 148 | 122 | * | * |
| 11 | SiO$_2$ #5 | 0.72 | * | * | 47 | 35 |
| 12 | SiO$_2$ #6 | 0.15 | 58 | 52 | 74 | 55 |
| 13 | SiO$_2$ #2 | 13.2 | 160 | 160 | * | * |
| 14 | SiO$_2$ #1 | 16.6 | 156 | 148 | 139 | 121 |

* indicates contact angle could not be measure because of wetting

Example 15

Single functionalization was conducted wherein the chosen inorganic oxide was SiO$_2$ #2 resulting in treated particles. These treated particles wherein subjected to the capping step wherein the chosen capping agent was Cl—S(O)$_2$—(CH$_2$)$_2$—(CF$_2$)$_5$—CF$_3$ thereby making hydrophobized particles having a fluorosilane residue of ≡Si—(CH$_2$)$_3$—NH—S(O)$_2$—(CH$_2$)$_2$—(CF$_2$)$_5$—CF$_3$. The symbol "≡" represents three covalent bonds from silicon, at least one of which is bonded to the particle surface. A film sample was made by thin film casting using these hydrophobized particles. Contact angle measurements were conducted on this film sample and are shown in Table 6.

Example 16

Example 15 was repeated except the chosen inorganic oxide was SiO$_2$ #1.

Example 17

Double functionalization was conducted wherein the chosen inorganic oxide was SiO$_2$ #2 resulting in treated particles. These treated particles wherein subjected to the capping step wherein the chosen capping agent was Cl—S(O)$_2$—(CH$_2$)$_2$—(CF$_2$)$_5$—CF$_3$ thereby making hydrophobized particles having a fluorosilane residue of ≡Si—(CH$_2$)$_3$—NH—S(O)$_2$—(CH$_2$)$_2$—(CF$_2$)$_5$—CF$_3$. The symbol "≡" represents three covalent bonds from silicon, at least one of which is bonded to the particle surface. A film sample was made by thin film casting using these hydrophobized particles. Contact angle measurements were conducted on this film sample and are shown in Table 6.

Example 18

Example 17 was repeated except the chosen inorganic oxide was SiO$_2$ #1.

TABLE 6

| Example | Inorganic Oxide Particle | % F | Contact Angle Measurements (°) | | | |
|---|---|---|---|---|---|---|
| | | | H$_2$O Adv. | H$_2$O Rec. | C$_{16}$H$_{12}$ Adv. | C$_{16}$H$_{12}$ Rec. |
| 15 | SiO$_2$ #2 | 11.3 | 149 | 140 | * | * |
| 16 | SiO$_2$ #1 | 12.9 | 150 | 148 | 132 | 126 |
| 17 | SiO$_2$ #2 | 12.4 | 145 | 139 | * | * |
| 18 | SiO$_2$ #1 | 10.6 | 147 | 146 | 147 | 144 |

* indicates contact angle could not be measure because of wetting

Example 19

Double functionalization was conducted wherein the chosen inorganic oxide was SiO$_2$ #1 resulting in treated particles. These treated particles wherein subjected to the capping step wherein the chosen capping agent was CH$_2$=CH$_2$—C(O)—O—(CH$_2$)$_2$—(CF$_2$)$_5$—CF$_3$ thereby making hydrophobized particles having a fluorosilane residue of ≡Si—(CH$_2$)$_3$—N[(CH$_2$)$_2$—C(O)—O—(CH$_2$)$_2$—(CF$_2$)$_5$—CF$_3$]$_2$. The symbol "≡" represents three covalent bonds from silicon, at least one of which is bonded to the particle surface. A film sample was made by thin film casting using the hydrophobized particles obtained after second precursor double grafting. Contact angle measurements were conducted on this film sample and are shown in Table 7.

TABLE 7

| Example | Inorganic Oxide Particle | % F | Contact Angle Measurements (°) | | | |
|---|---|---|---|---|---|---|
| | | | H$_2$O Adv. | H$_2$O Rec. | C$_{16}$H$_{12}$ Adv. | C$_{16}$H$_{12}$ Rec. |
| 15 | SiO$_2$ #1 | 18.9 | 154 | 151 | 129 | 116 |

* indicates contact angle could not be measure because of wetting

NMR Analysis of Example 14

Figure 2:
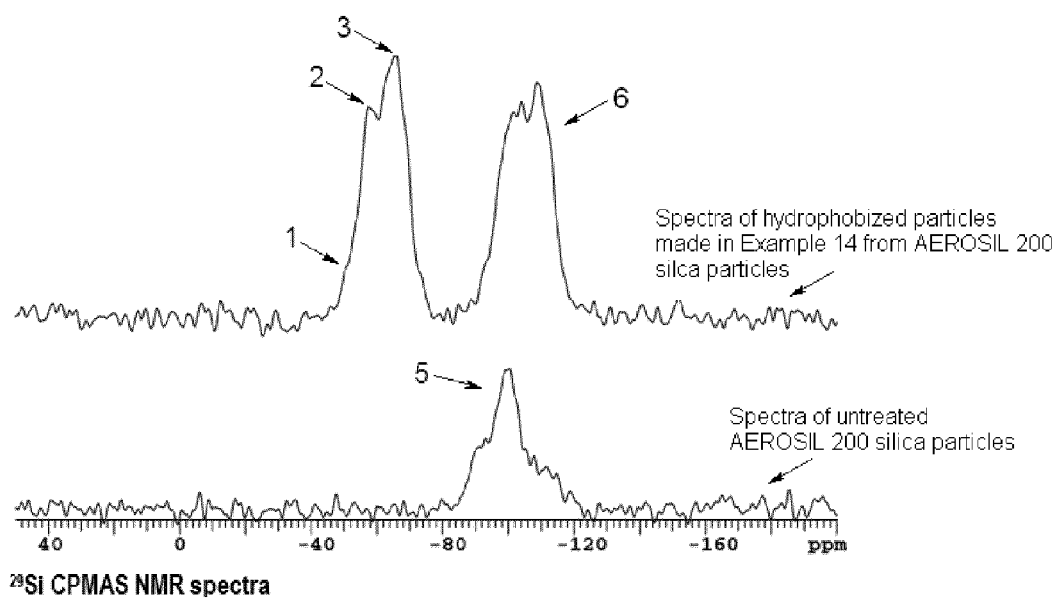
FIG. 2 are spectra obtained by solid-state $^{29}$Si NMR cross-polarization magic angle spinning analysis (CPMAS) of: 1) hydrophobized particle made from silica particles (AEROSIL 200) obtained in accordance with the invention; and 2) untreated silica particles (AEROSIL 200).

The hydrophobized particles made from SiO$_2$#1 (AEROSIL 200) silica particles obtained in Example 14 were subjected to solid-state $^{29}$Si NMR cross-polarization magic angle spinning analysis (CPMAS) resulting in the spectra shown in FIG. 2. Also shown in FIG. 2 is the spectra using the same $^{29}$Si NMR CPMAS analysis of untreated SiO$_2$ #1 (AEROSIL 200) silica particles.

FIG. 1 is a simplified depiction of a hydrophobized particle made from SiO$_2$ #1 (AEROSIL 200) silica particles obtained in Example 14. Referring to FIG. 1, the silicon atom of fluorosilane residues is depicted by A1, A2, B1, B2, C1, and C2. In the formula of the fluorosilane residue depicted in FIG. 1, L$^2$ represents —OCH$_3$ or —OH. A1 and A2 show the silicon atom of fluorosilane residues bonded to the surface of the silica particle through one oxygen atom. B1 and B2 show the silicon atom of fluorosilane residues bonded to the surface of the silica particle through two oxygen atoms. C1 and C2 show the silicon atom of fluorosilane residues bonded to the surface of the silica particle through three oxygen atoms. D1, D2, D3, and D4 depict silicon atoms at the surface of the silica particle which are not bonded to a fluorosilane residue.

Referring to FIG. 2 and the spectra of hydrophobized particles, 1 depicts a signal consistent with the silicon atom of fluorosilane residues depicted as C1 and C2 in FIG. 1. Referring to FIG. 2 and the spectra of hydrophobized particles, 2 depicts a signal consistent with the silicon atom of fluorosilane residues depicted as B1 and B2 in FIG. 1. Referring to FIG. 2 and the spectra of hydrophobized particles, 3 depicts a signal consistent with the silicon atom of fluorosilane residues depicted as A1 and A2 in FIG. 1. Referring to FIG. 2 and the spectra of hydrophobized particles, 6 depicts a signal consistent silicon atoms at the surface of the silica particle which are not bonded to a fluorosilane residue depicted as D1, D2, D3, and D4 in FIG. 1.

Referring to FIG. 2 and the spectra of untreated particles, 5 depicts a signal consistent with silicon atoms at the surface of the silica particle which are not bonded to a fluorosilane residue depicted as D1, D2, D3, and D4 in FIG. 1. Referring to FIG. 2 and the spectra of untreated particles, notably absent are any signals corresponding to those depicted by 1, 2, and 3 in the spectra of hydrophobized particles.

What is claimed is:

1. Surface modified inorganic oxide particles comprising an oxide of M wherein M is independently selected from the group consisting of Si, Ti, Zn, Zr, Mn, Al, and combinations thereof; at least one of said particles having a surface covalently bonded to at least one fluorosilane group represented by Formula (1)

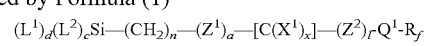

wherein
L$^1$ represents an oxygen covalently bonded to an M; and each L$^2$ independently selected from the group consisting of H, a C$_1$-C$_2$ alkyl, and OH; d and c are integers such that: d≧1, c≧0, d+c=3;
each n is independently an integer from 1 to 12;
a, x, and 1 are integers chosen such that the moiety of Formula 1 represented by —(Z$^1$)$_a$—[C(X$^1$)]$_x$—(Z$^2$)$_l$—

$R_f$ is chosen from a $C_2$-$C_{12}$ perfluoroalkyl provided that:
i) one fluorine atom of the perfluoroalkyl can be optionally replaced by hydrogen, and/or ii) the perfluoroalkyl can be optionally interrupted by at least one oxygen, methylene, or ethylene;

$Q^1$ is chosen from the group consisting of a $C_2$-$C_{12}$ hydrocarbylene optionally interrupted by at least one divalent organic group;

$X^1$ is chosen from O or S;
  a) $Z^1$ is —NH— and $Z^2$ is from the group consisting of —NH—, —S—, —NH—S(O)$_2$—, —N[C(O)H]—, —[HC(COOH)(R$^1$)]CH—S—, and —(R$^1$)CH—[HC(COOH)]—S—;
    each $R^1$ is independently chosen from hydrogen, phenyl, or a monovalent $C_1$-$C_8$ alkyl optionally terminated by —$C_5H_5$, preferably H or $CH_3$;
    provided that when $Z^1$ is —NH— and $Z^2$ is —NH—, then $Q^1$ is chosen from the group consisting of a $C_2$-$C_{12}$ hydrocarbylene interrupted by at least one divalent organic group.

2. The particles of claim 1 wherein the fluorosilane group represented by Formula (1) is a urea or thiourea fluorosilane group such that in Formula (1):
a=1, x=1, and l=1;
$Z^1$ is —NH— and $Z^2$ is —NH—;
said urea or thiourea fluorosilane group further represented by the formula:

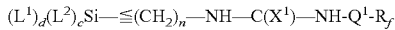

wherein:
$X^1$ is O to form a urea fluorosilane group, or $X^1$ is S to form a thiourea fluorosilane group; and
$Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

3. The particles of claim 2 wherein $R_f$ is chosen from a $C_2$-$C_{12}$ perfluoroalkyl and $Q^1$ is independently chosen from the group consisting of a $C_2$-$C_{12}$ hydrocarbylene interrupted by least one divalent moiety chosen from the group consisting of —S—, —S(O)—, —S(O)$_2$—, and —O—C(O)—NH—.

4. The particles of claim 2 wherein $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

5. The particles of claim 1 wherein the fluorosilane group represented by Formula (1) is a carbamate fluorosilane group such that in Formula (1):
$Z^1$ is —NH— and $Z^2$ is; and
$X^1$ is O;
said carbamate fluorosilane group further represented by the formulae:

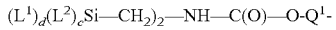

wherein:
$Q^1$ is a $C_2$-$C_{12}$ hydrocarbylene optionally interrupted by at least one divalent moiety chosen from the group consisting of —NH—C(O)—NH—, —NH—C(S)—NH—, —S—, —S(O)—, S(O)$_2$—, —(R$^1$)N—S(O)$_2$—,

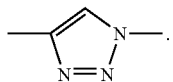

6. The particles claim 5 wherein $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

7. The particles of claim 5 wherein $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

8. The particles of claim 1 wherein the fluorosilane group represented by Formula (1) is a thiolcarbamate fluorosilane group such that in Formula (1):
$Z^1$ is —NH— and $Z^2$ is —S—; and
$X^1$ is O;
said thiolcarbamate fluorosilane group further represented by the formulae:

wherein:
$Q^1$ is independently chosen from the group consisting of a $C_2$-$C_{12}$ hydrocarbylene optionally interrupted by at least one divalent moiety chosen from the group consisting of —S—, —S(O)—, —S(O)$_2$—, —N(R$^1$)—C(O), —C(O)—N(R$^1$)—, —(R$^1$)N—S(O)$_2$—, and

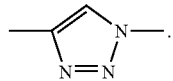

9. The particles of claim 8 wherein $R_f$ is chosen from a $C_2$-$C_{12}$ perfluoroalkyl and $Q^1$ is independently chosen from the group consisting of a $C_2$-$C_{12}$ hydrocarbylene interrupted by at least one divalent moiety chosen from the group consisting of —S—, —S(O)—, —S(O)$_2$—, and —O—C(O)—NH—.

10. The particles of claim 8 wherein $R_f$ is chosen from a $C_2$-$C_{12}$ perfluoroalkyl provided that: i) one fluorine atom of the perfluoroalkyl is replaced by hydrogen, and/or ii) the perfluoroalkyl is interrupted by at least one oxygen, methylene, or ethylene.

11. The particles of claim 1 further comprising at least one particle having a surface covalently bonded to a N-sulfone urea fluorosilane group such that in Formula (1):
$Z^1$ is —NH—, and $Z^2$ is —NH—S(O)$_2$—; and
$X^1$ is O;
said N-sulfone urea fluorosilane group further represented by the formula:

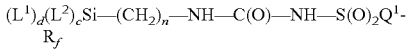

wherein:
$Q^1$ is independently chosen from the group consisting of an uninterrupted $C_2$-$C_{12}$ hydrocarbylene.

12. The particles of claim 1 further comprising at least one particle having a surface covalently bonded to a N-formyl urea fluorosilane group such that in Formula (1):
a=1, x=1, and l=1; and
$Z^1$ is —NH—, and $Z^2$ is —N[C(O)H]—;
said N-formyl urea group further represented by the formula:

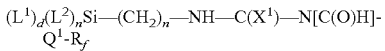

wherein:
Q$^1$ is independently chosen from the group consisting of a C$_2$-C$_{12}$ hydrocarbylene interrupted by at least one divalent moiety chosen from the group consisting of —S— and —NH—.

13. The particles of claim 1 further comprising at least one particle having a surface covalently bonded to a thioether succinamic acid fluorosilane group such that in Formula (1):
a=1, x=1, and l=1;
Z$^1$ is —NH— and Z$^2$ is —[HC(COOH)(R$^1$)]CH—S— or —(R$^1$)CH—[HC(COOH)]—S—;
X$^1$ is O; and Q$^1$ is —(CH$_2$)$_2$—;
said thioether succinamic acid group further represented by the formulae:

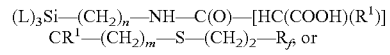

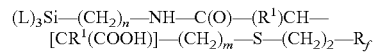

wherein m is 1 or 0; wherein each R$^1$ is independently chosen from methyl or hydrogen preferably H.

* * * * *